Patented Dec. 23, 1952

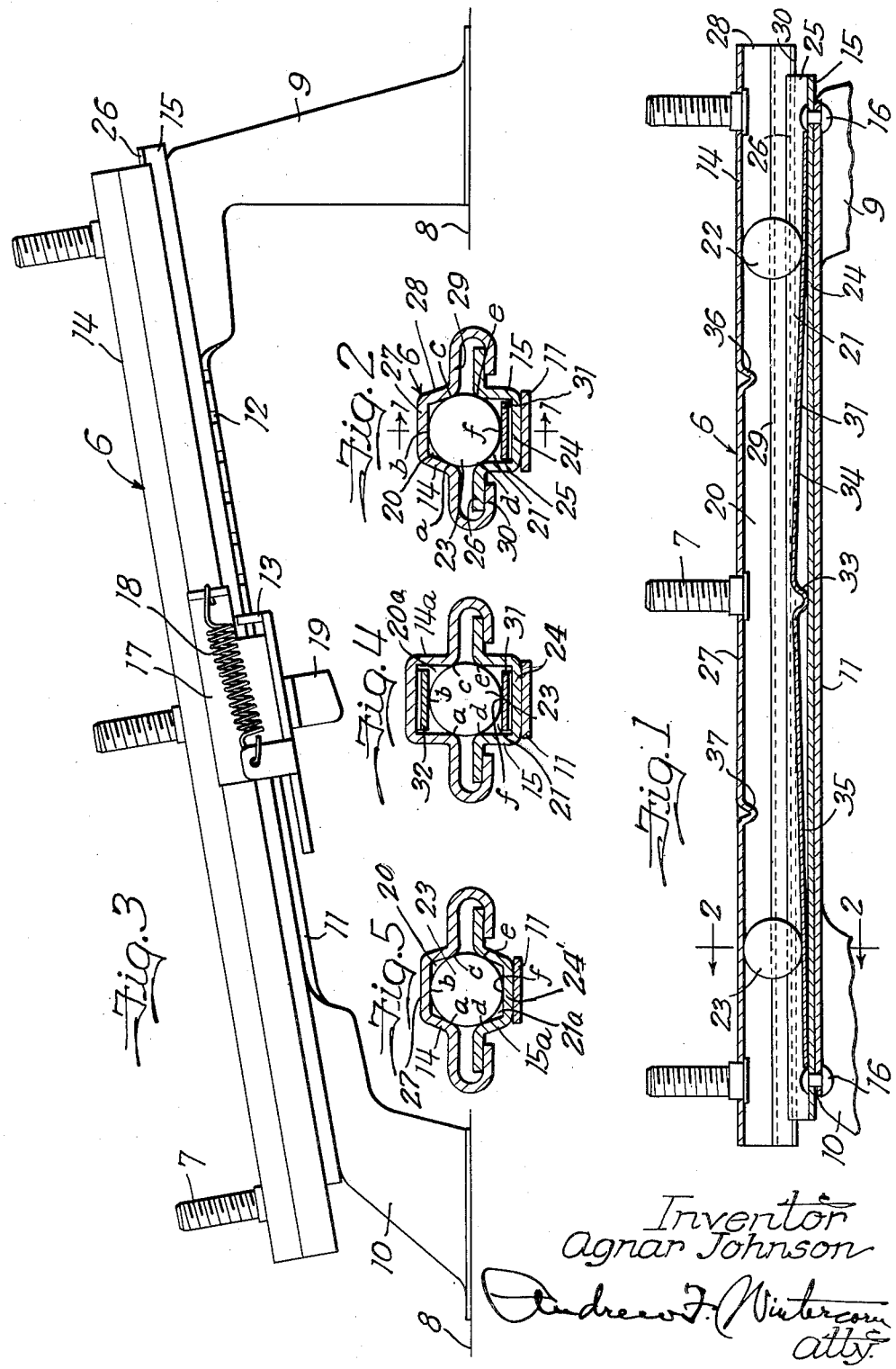

2,622,940

UNITED STATES PATENT OFFICE 2,622,940

BALL BEARING SLIDE STRUCTURE

Agnar Johnson, Rockford, Ill., assignor to Atwood Vacuum Machine Company, Rockford, Ill., a corporation of Illinois Application August 2, 1946, Serial No. 687,886

9 Claims. (Cl. 308—6)

1

This invention relates to ball bearing slide structures generally and is herein more particularly concerned with one designed for application to adjustable seats for use in vehicles such as automobiles.

Seat slides have been devised using balls or rollers for anti-friction means in an effort to obtain easier operation. However, despite the fact that some seat slide structures utilized as many as six balls per slide, the desired easy operation was not obtained and there was still too much likelihood of the parts tending to bind. Needless to say, the provision of a multiplicity of ball raceways, added to the cost of the expensive steel bearing balls, when used in such large numbers, as mentioned, involved too much expense to make such seat slide structures commercially feasible. It is, therefore, the principal object of my invention to provide a simpler and far less expensive seat slide assembly wherein only two bearing balls are required per assembly, instead of six, and which embodies these balls in such a way that accurate ball raceways therefor can be provided with no added cost over what was involved in the ordinary roller type seat slides, and in which the balls positively guide the relatively reciprocable parts for straight line movement and so that there is no sliding friction and no likelihood of the parts binding, thus assuring much easier operation than has heretofore been obtainable.

Another object of the invention is to provide a seat slide of stamped sheet metal construction for lightness and economy while still possessing the requisite strength and rigidity and the desired accuracy in the ball raceways.

Still another object of the invention is to provide a seat slide comprising a pair of parallel relatively reciprocable opposed channel members each formed with a substantially flat bottom web between uniformly spaced upright side walls, with ball bearings within the channels running on the bottoms of the same and guided by the side walls thereof, and embodying spring means exerting pressure on the balls always in one direction toward one of the relatively reciprocable parts of the seat slide structure to hold the balls in the proper spaced relationship at all times, regardless of the positions of adjustment of the seat, the spring means being preferably in the form of a leaf spring either in the bottom of the lower channel member or in the upper channel member, or in both members, for the double purpose of providing spring tension in the assembly to hold the balls in place, and providing a hardened surface

2 or surfaces for the balls to run on, thus enabling predetermined preloading of the structure without danger of the balls forming grooves in the sheet metal parts of the seat slide assembly.

The invention is illustrated in the accompanying drawing, in which:

Fig. 1 is a longitudinal section through a seat slide assembly made in accordance with my invention, the section being taken on the line 1—1 of Fig. 2;

Fig. 2 is a cross section on the line 2—2 of Fig. 1;

Fig. 3 is a side view of the complete seat slide structure, and

Figs. 4 and 5 are cross sections similar to Fig. 2 but showing two modified or alternative constructions.

Similar reference numerals are applied to corresponding parts throughout the views.

The seat slide structure with which my invention is concerned is indicated generally by the reference numeral 6, there being two such structures provided in connection with each seat attached to the bottom of the seat by means of bolts 7 or in any other suitable manner, and secured to and supported upon the floor 8 on the legs or brackets 9 and 10, suitably of hollow sheet metal construction, provided on the front and rear ends of the seat slide structure, respectively. The brackets 9 and 10 are herein illustrated as interconnected by a web portion 11, the forward end portion of which is notched, as indicated at 12, to form a rack to cooperate with a latch 13 to lock the seat in any one of a plurality of adjusted positions. Each seat slide structure comprises upper and lower longitudinally extending channel members 14 and 15, the member 14 carrying the bolts 7 previously mentioned, and the member 15 being secured in any suitable manner to the supporting brackets 9 and 10, as by rivets 16. The latch 13 is in the form of a lever pivotally mounted on the sheet metal bracket 17 suitably secured to one side of the upper member 14 so as to move with the seat in the fore and aft adjustment thereof. A coiled tension spring 18 normally urges the latch 13 in one direction toward locking engagement with the rack 12, and there is a handle 19 projecting laterally from the latch 13 easily accessible to the driver sitting on the seat in the driver's position for release of the latch 13 against the action of the spring 18 whenever it is desired to adjust the seat.

The slide members 14 and 15 are of stamped sheet metal construction, like the supporting bracket structure 9—11, for lightness and economy, as well as strength and rigidity, and are formed to provide channels 20 and 21 therein in which two bearing balls 22 and 23 operate to maintain the slide members in a normal spaced relationship and at the same time guide the upper slide member 14 for movement in a straight line relative to the lower slide member 15. The lower slide member 15 has the rivets 16 entered through the flat bottom web portion 24 of the channel 21 and has the side walls 25 of the channel bent outwardly to provide longitudinally extending flanges 26. In a similar manner the upper slide member 14 has the bolts 7 anchored in the flat bottom web portion 27 of the channel 20 and has the side walls 28 bent outwardly to provide longitudinally extending flanges 29, the outer edge portions of which are bent inwardly, as indicated at 30, under the flanges 26 on the lower slide member 15 to hold the parts in assembled relation. The bending outwardly of the sides of the channel members to form the flanges as just described forms rounded longitudinally extending bearing surfaces at the juncture of the flanges and side walls which are adapted to be engaged by the balls 22 and 23 to prevent lateral relative motion of the channel members. The channel 20 has point load bearing contact on the top portion of the balls 22 and 23 at $a$, and point guide bearing contact on opposite sides of the upper portion thereof at $b$ and $c$, and the channel 21 has point guide bearing contact on opposite sides of the lower portion of the balls 22 and 23 at $d$ and $e$, the channel 21 being deeper than the channel 20 to provide room for a leaf spring 31 which forms a liner for the bottom of the channel 21 and has load bearing point contact with the bottom of the balls 22 and 23 at $f$. I may, as will soon appear, eliminate the leaf spring 31 and make the channel 21 shallower so that the balls 22 and 23 seat directly on the web 24' at $f$, as shown in Fig. 5, wherein the channels are numbered 20 and 21$a$, and, on the other hand, I may provide leaf springs 31 and 32 below and above the balls 22 and 23, as illustrated in Fig. 4, wherein the channels are numbered 20$a$ and 21. Reverting to Figs. 1–3, the leaf spring 31 has a transversely extending V-shaped hump 33 bent in the middle portion thereof and this hump rests on the web portion 24 of the lower slide member 15 so as to support the inner ends of the front and rear half portions 34 and 35 of the leaf spring in elevated relation to the bottom of the channel, these portions being depressed more or less by the balls 22 and 23 in different positions of adjustment of the seat and having abutment at their extremities with the heads of the rivets 16 so that the leaf spring is positively held against endwise displacement relative to the lower slide member 15. The primary purpose of the leaf spring 31 is to provide spring tension to hold the balls 22 and 23 in place, but it also provides a hardened track surface for the balls to run on so that there will be no danger of the balls forming grooves in the web portion 24 of the lower slide 15, which would be objectionable not only from the standpoint of the wearing away of the metal and the likelihood of the slide 15 having to be replaced ultimately, but also from the standpoint that the wear of this part would ultimately result in too much play, and consequently, rattling and generally unsatisfactory operation. With the leaf spring 31 exerting spring pressure on the balls 22 and 23, the slide members 14 and 15 are maintained under tension until a load is placed on the seat to counteract this tension, whereupon the upper slide 14 can be slid freely in either direction with respect to the lower slide 15. The balls 22 and 23 are shown in positions half way between the rivets 16 and indented portions 36 and 37 provided in the web 27 of the upper slide 14, which are adapted to cooperate with the balls to positively limit adjustment of the seat forwardly and rearwardly from the mid position illustrated, the indented portion 36 cooperating with the ball 22 and the head of the front rivet 16 at the limit of forward adjustment, and the abutment 37 cooperating with the ball 23 and the head of the rear rivet 16 at the limit of rearward adjustment.

In operation, this seat slide differs from those heretofore proposed because it can be preloaded in its assembly to make it as "tight" as desired, meaning that there will be more or less tensioning of the leaf spring 31, whereas in earlier designs there was always a compromise, the structure being "tightened up" only to the extent where it would not be apt to interfere too much with more or less easy seat adjustment. In the present case the spring 31 holds the balls 22 and 23 normally out of engagement with the points $d$ and $e$ with a few thousandths of an inch clearance until the seat is placed under load, whereupon the balls 22 and 23 are forced down deeper into the channel by deflection of the spring 31 under the load and into contact at the points $d$ and $e$ and the clearance that formerly existed at these points exists between the flanges 30 and 26 so that the seat slide is extremely free running. The fact that the balls 22 and 23 have side bearing point contact at $a$, $c$, $d$, and $e$ eliminates any opportunity for sideplay and the upper slide 14 is accordingly guided for straight line movement, thus eliminating sliding friction between the slides 14 and 15 which would interfere with free running, and avoiding any likelihood of the upper slide 14 getting cocked at a binding angle with respect to the lower slide 15. In the assembling of the seat slide, the preload pressure is, of course, determined by the extent of compression of the channel shaped side portions 29—30 of the upper slide 14 in the bending inwardly of the flanges 30 under the flanges 26 of the lower slide 15.

The construction of Fig. 5, in which there are no leaf springs, has the balls 22 and 23 in load bearing contact at $a$, and guide bearing contact at $b$ and $c$ in the upper channel 20 and similarly at $d$, $e$ and $f$ in the lower channel 21$a$. However, if desired, hardened metal strips may be welded or otherwise suitably secured on the web portions 24' and 27 of the two slide members 14 and 15$a$ to provide hardened track surfaces, or the slide members 14 and 15$a$ may themselves be hardened to resist wear. With this construction, straight line movement of the upper slide is assured similarly as in the construction of Figs. 1 to 3, and the construction may, furthermore, be preloaded to a desired degree depending wholly upon the resilience of the sheet metal in the upper slide to place the balls 22 and 23 under tension to hold them in place and make for tightness of the seat slide assembly up to the time that a load is placed on the seat, when the assembly will operate more or less freely.

The construction of Fig. 4, using two leaf springs 31 and 32, wherein the leaf spring 32 is of a form substantially identical with the spring 31, operates similarly as that disclosed in Figs. 1 to 3. In this construction the upper spring 32 utilizes the heads of the front and rear bolts 7 to prevent endwise displacement, similarly as the heads of the rivets 16 cooperate with the leaf spring 31 in Fig. 1, but the spring 32 has openings provided therein through which enlarged depressed portions 36 and 37 on the upper slide 14a project to cooperate with the balls 22 and 23.

It is believed the foregoing description conveys a good understanding of the objects and advantages of my invention. The appended claims have been drawn to cover all legitimate modifications and adaptations.

I claim:

1. A slide structure comprising, in combination, a pair of opposed and relatively slidable channel members, each channel member having in the channel cross-section thereof a web between uniformly spaced upright side walls, the opposed inside surfaces of which are adapted to serve as bearing surfaces, said channel members having troughs of substantially the same width but one trough being deeper than the other, at least two longitudinally spaced balls disposed between said channel members and projecting to a substantial extent into the troughs of both of them and serving to space said members, said balls having rolling contact on the web of the shallower channel and on the bearing surfaces on the side walls of the channels so as to guide said members for straight line non-binding movement relative to one another, elongated bowed leaf spring means extending lengthwise of the bottom of the deeper channel and arranged so that the balls roll thereon in the relative movement of said members, said leaf spring means exerting pressure on the balls in a direction substantially at right angles to the direction of relative movement of the members whereby to prevent displacement of said balls from the positions assumed thereby in the relative movement, the channel members being formed from sheet metal and spaced upright side walls of said members being bent to define outwardly projecting flanges, the longitudinal edge portions of the outwardly projecting flanges on one of said members being bent inwardly toward each other to enclose the longitudinal edge portions of the outwardly projecting flanges on the other channel member to hold said members in assembled relation, means for securing one of said members on a support, and means for securing the other of said members to a part to be slidably supported.

2. A slide structure comprising, in combination, a pair of opposed and relatively slidable sheet metal channel members, each channel member having the sheet metal body thereof bent to define in the channel cross-section thereof a web and uniformly spaced side walls, said side walls being bent to define outwardly projecting flanges and rounded bearing surfaces substantially the full length of each channel member at the junctions of the side walls and the flanges in the entrances to the channels, said channel members having troughs of substantially the same width but one trough being deeper than the other, at least two longitudinally spaced bearing balls disposed between said channel members and projecting to a substantial extent into the troughs of both of them and serving to space and guide said members by point rolling contact on the bottom of the trough in the shallower one of said channel members and on the rounded bearing surfaces on the side walls of both of said channel members, whereby said members are guided for straight line non-binding movement relative to one another, elongated bowed leaf spring means extending lengthwise of the bottom of the deeper channel and arranged so that the balls roll thereon in the relative movement of said members, said leaf spring means exerting pressure on the balls in a direction substantially at right angles to the direction of relative movement of the members, whereby to prevent displacement of said balls from the positions assumed thereby in the relative movement, means for securing one of said members on a support, means for securing the other of said members to a part to be slidably supported, and means for holding said members in assembled relation.

3. A slide structure comprising in combination a pair of parallel, relatively reciprocable, opposed, substantially U-shaped elongated channel members each providing three distinct load bearing surfaces at the sides and bottom thereof, respectively, at least two longitudinally spaced bearing balls disposed between said channel members, the diameter of said balls being greater than the combined depths of said channel members whereby to space the channel members apart and movably support one of the channel members upon the other by virtue of said balls establishing point rolling engagement with said load bearing surfaces provided by said channel members, means for securing one of said channel members on a support, means for securing the other of said channel members to a part to be slidably supported, and means for holding said channel members in assembled relation.

4. A slide structure as set forth in claim 3, wherein the said load bearing surface provided at the bottom of at least one of said channel members is constituted by the surface of bowed leaf spring means, said leaf spring means being supported upon the web interconnecting the sides of the channel member, said leaf spring means exerting pressure on the balls in a direction substantially at right angles to the direction of movement whereby to prevent displacement of said balls from the positions assumed thereby in the movement.

5. A slide structure as set forth in claim 3 wherein the said load bearing surface provided at the bottom of at least one of said channel members is constituted by the surface of bowed leaf spring means, said leaf spring means being supported upon the web interconnecting the sides of the channel member, said leaf spring means exerting pressure on the balls in a direction substantially at right angles to the direction of movement whereby to prevent displacement of said balls from the positions assumed thereby in the movement, said slide structure further including means preventing endwise displacement of said leaf spring means relative to said channel member.

6. A slide structure as set forth in claim 3 wherein the said load bearing surface provided at the bottom of at least one of said channel members is constituted by the surface of a bowed leaf spring, said leaf spring being supported upon the web interconnecting the sides of the channel member, said leaf spring exerting pressure on the balls in a direction substantially at right angles to the direction of movement whereby to prevent displacement of said balls from the positions assumed thereby in the movement, said slide structure further including means supporting an intermediate portion of said leaf spring between said balls in elevated relation upon said connecting web.

7. A slide structure as set forth in claim 3 wherein the said load bearing surface provided at the bottom of at least one of said channel members is constituted by the surface of the web interconnecting the sides of the channel member.

8. A slide structure as set forth in claim 3 wherein the sides of said channel members include outwardly projecting flanges providing rounded surfaces at the junctions of said sides and flanges and which rounded surfaces constitute the load bearing surfaces at the sides of the channel members.

9. A slide structure as set forth in claim 3 wherein the means for holding said channel members in assembled relation comprises mutually confronting flanges projecting outwardly from the sides of said channel members, at least one of the flanges on one of said channel members including a portion extending around the longitudinal edge portion of the confronting flange on the other said channel member.

AGNAR JOHNSON.

REFERENCES CITED

The following references are of record in the file of this patent:

UNITED STATES PATENTS

| Number | Name | Date |
|---|---|---|
| 819,270 | Fox | May 1, 1906 |
| 1,069,277 | Meldau | Aug. 5, 1913 |
| 1,917,923 | Clarke | July 11, 1933 |
| 2,003,549 | Miller | June 4, 1935 |
| 2,129,637 | Atwood | Sept. 13, 1938 |
| 2,271,913 | Crabb | Feb. 3, 1942 |
| 2,278,101 | Brown | Mar. 31, 1942 |

FOREIGN PATENTS

| Number | Country | Date |
|---|---|---|
| 722,489 | Germany | July 10, 1942 |